United States Patent [19]

Langmesser, Jr. et al.

[11] Patent Number: 4,556,186
[45] Date of Patent: * Dec. 3, 1985

[54] SEAT ADJUSTER

[75] Inventors: Otto J. Langmesser, Jr., Fraser; Charles R. Lock, Sterling Heights; James C. Wood, Bloomfield Hills, all of Mich.

[73] Assignee: General Motors Corporation, Detroit, Mich.

[*] Notice: The portion of the term of this patent subsequent to Dec. 11, 2001 has been disclaimed.

[21] Appl. No.: 523,076

[22] Filed: Aug. 15, 1983

[51] Int. Cl.⁴ ............................................. F16M 13/00
[52] U.S. Cl. .................................. 248/429; 296/65 R; 308/3 R
[58] Field of Search ............... 248/429, 430, 424, 420; 308/3.8, 6 R, 3.6, 3 R; 296/63, 65 R; 297/473

[56] References Cited

U.S. PATENT DOCUMENTS

| | | | |
|---|---|---|---|
| 3,013,763 | 12/1961 | Weberman | 248/429 |
| 3,171,698 | 3/1965 | Campbell | 308/3.8 |
| 3,184,209 | 5/1965 | Colautti | 248/429 |
| 3,350,046 | 10/1967 | Kirk | 248/430 |
| 3,392,954 | 7/1968 | Malitte | 248/429 |
| 3,393,019 | 7/1968 | Fraser et al. | 248/429 X |
| 4,072,347 | 2/1978 | Boisset | 248/429 |
| 4,375,905 | 3/1983 | Drouillard | 308/6 R |
| 4,483,504 | 11/1984 | Duwelshoft | 248/429 |
| 4,487,459 | 12/1984 | Rees | 248/429 |

FOREIGN PATENT DOCUMENTS 997741 7/1965 United Kingdom ................ 248/420

Primary Examiner—J. Franklin Foss
Assistant Examiner—David L. Talbott
Attorney, Agent, or Firm—Herbert Furman

[57] ABSTRACT

A seat adjuster includes upper and lower track members having interfitting U-shape cross-section side portions which are slidably guided relative to each other by runners of low friction plastic material. The track members are slidably supported relative to each other by a shoe of the same material. A latch member includes a U-shaped locking portion which is receivable within slots in the side portions of the upper track member and a pair of a plurality of slots in the lower track member to releasably lock the track members to each other. Seat mounting brackets have hook shaped portions which are hooked to the base wall of the upper track member to releasably secure the brackets thereto. The brackets support a vehicle seat on the upper track member. One of the brackets has provisions for mounting seat belt restraints thereto with the loads imposed on the upper track member by such restraints being resisted by the interfitting side portions of the track members.

4 Claims, 6 Drawing Figures

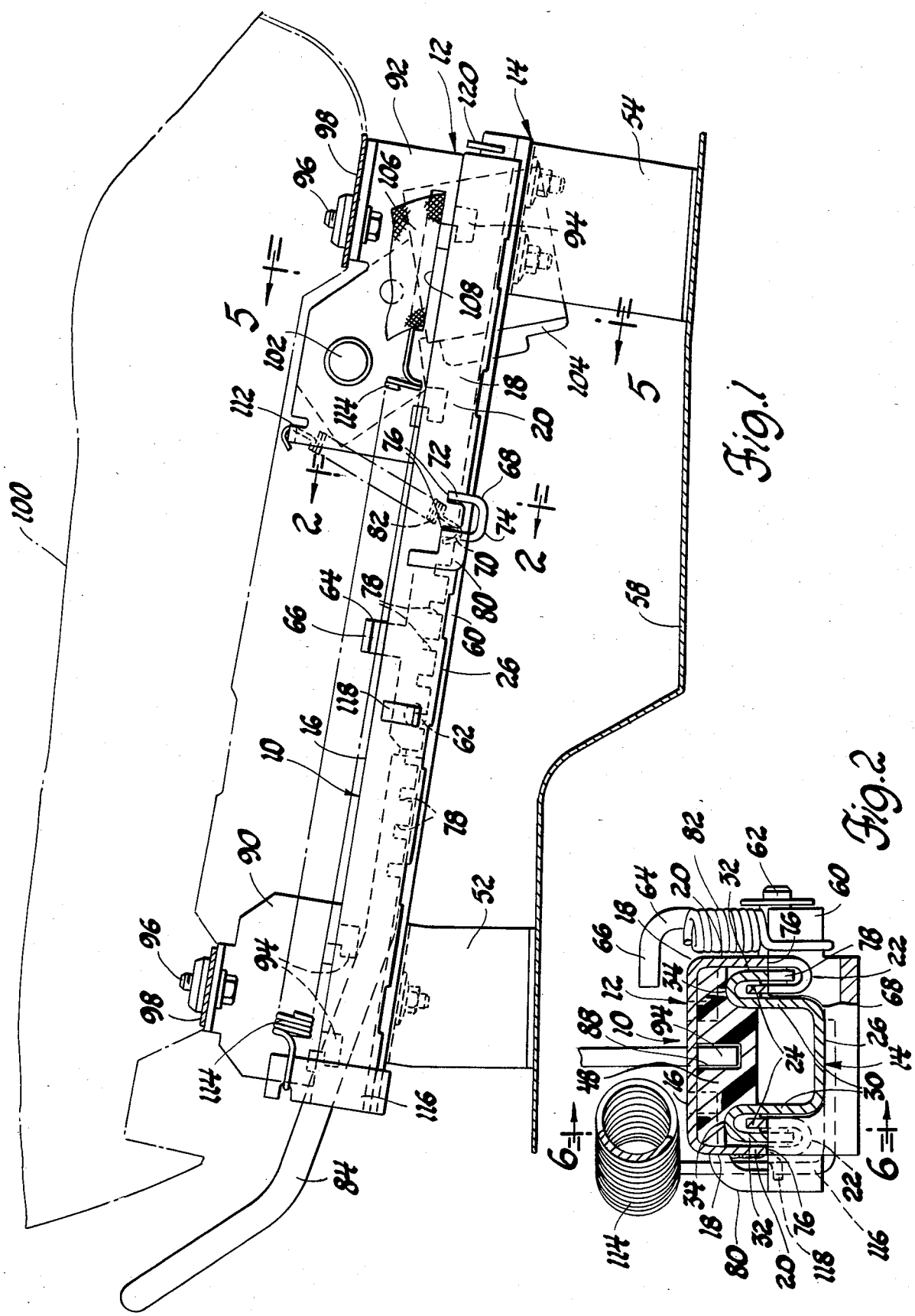

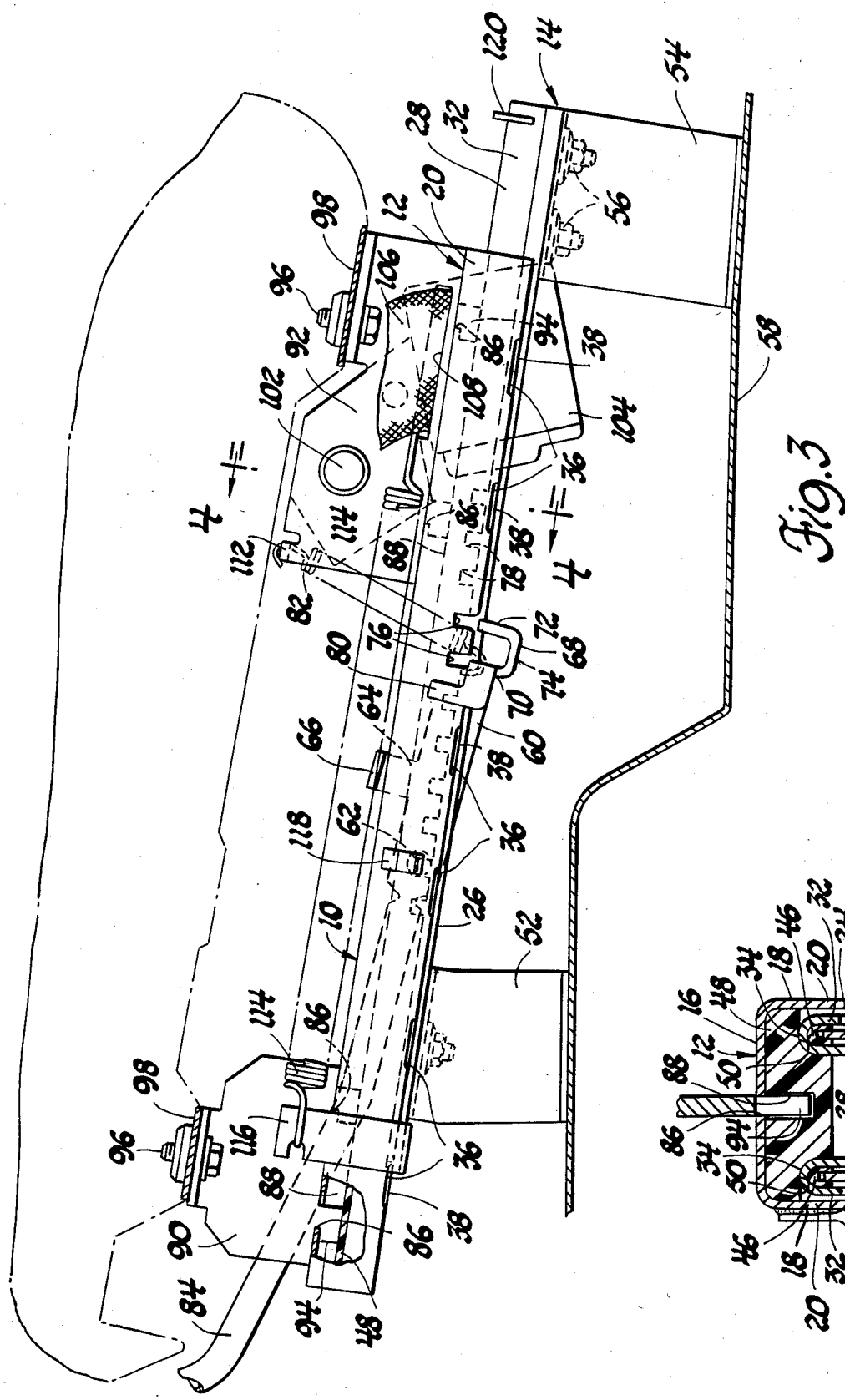

SEAT ADJUSTER

This invention relates to seat adjusters and more particularly to a vehicle seat adjuster of the type including upper and lower track members which slidably mount the vehicle seat on the vehicle body for horizontal movement to a plurality of adjusted positions and which can carry loads resulting from occupant restraints mounted thereto.

Seat adjusters of the general type disclosed herein are known in the prior art. However, the adjuster of this invention has several distinct features not shown in such prior art adjusters.

One feature of this invention is that the seat adjuster includes elongated upper and lower track members having interfitting U-shape cross-section side portions, with such side portions slidably guided for relative movement by runners of low friction plastic material, with the upper track member being supported on the lower track member by a shoe of the same material which fits between the base of the upper track member and the side portions of the lower track member. Another feature is that the side portions include first legs extending from a base wall of a track member and second free legs joined thereto across a bight portion, with the runners fitting between the free legs of the side portions of one track member and the bight portions of the side portions of the other track member. A further feature is that a latch member is mounted to the upper track member and has a generally U-shape locking portion which straddles the base wall of the lower track member and includes laterally spaced pairs of locking teeth which are received within spaced pairs of slots in the side portions of the upper track member and in a pair of a number of spaced slots in the free legs of the side portions of the lower track member. Yet another feature is that the base wall of the upper track member includes a plurality of pairs of elongated slots which permit hooked shaped portions of seat mounting brackets to be inserted within the upper track member and to be releasably secured to the base wall thereof upon movement of the brackets to a hooked position relative to such wall. Yet a further feature is that at least one such bracket has provisions for mounting occupant restraints, such as a retractor or a seat belt thereto, with the track members having sufficient strength to resist loads applied thereto from such restraints. Still another feature is that the latch member is biased to latched position by a spring interconnected between one such bracket and the latch member. Still a further feature is that an assist spring is hooked between the upper and lower track members, with the mounting bracket of the spring to the lower track member cooperating with a bracket of the upper track member to provide a positive stop limiting movement of the upper track member in one direction relative to the lower track member. Yet another feature is that a stop plate spans the lower track member adjacent one end thereof and is engageable by an end of the upper track member to provide a positive stop limiting movement of the upper track member in the opposite direction.

These and other features will be apparent from the following specification and drawings wherein:

FIG. 1 is a side elevational view of a seat adjuster according to this invention.

FIG. 2 is an enlarged sectional view taken generally along line 2—2 of FIG. 1.

FIG. 3 is a partially broken away view similar to FIG. 1 with the latch member released.

FIG. 4 is an enlarged sectional view taken generally along line 4—4 of FIG. 3.

Figure 5:
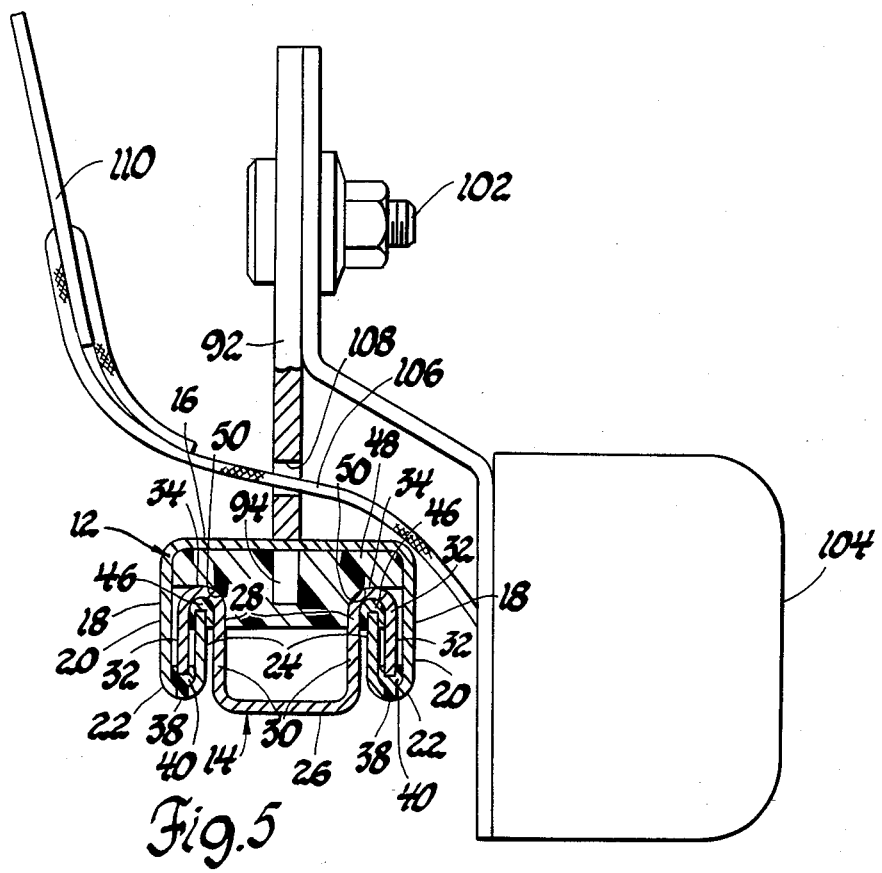
FIG. 5 is an enlarged sectional view taken generaly along line 5—5 of FIG. 1.
Figure 6:
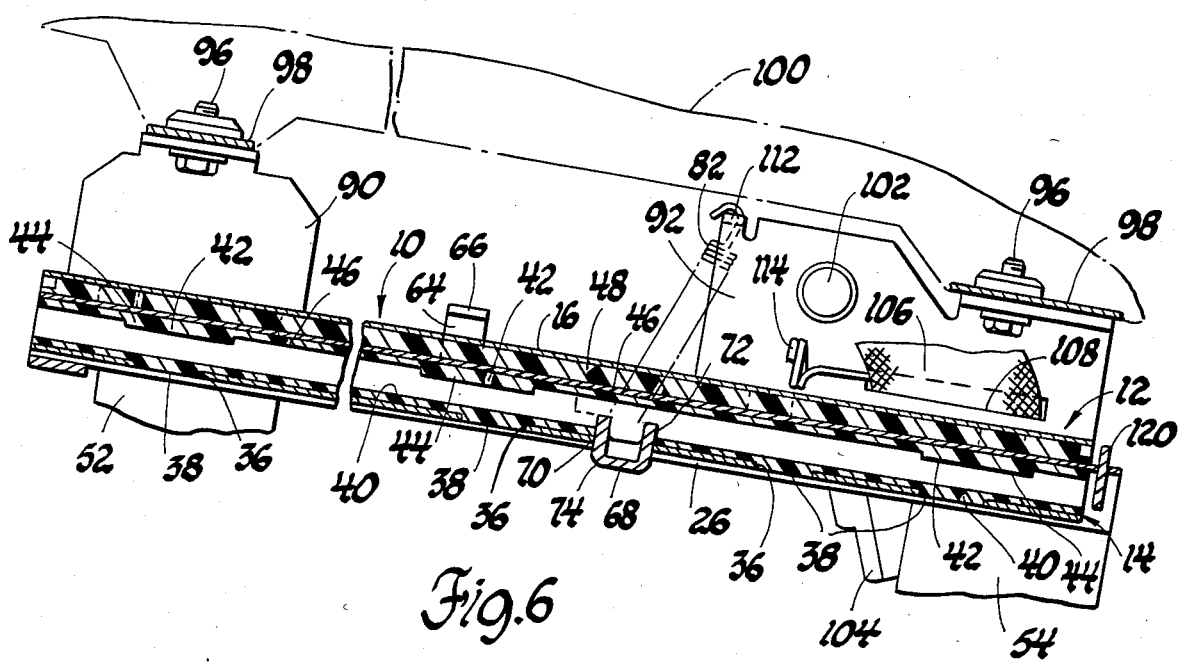
FIG. 6 is a view taken generally along line 6—6 of FIG. 2.

Referring now particularly to FIG. 1 of the drawings, a vehicle seat adjuster 10 according to this invention includes an upper track member 12 and a lower track member 14. As shown in FIGS. 2, 4 and 5, the upper track member 12 includes a base wall 16 and a pair of U-shape cross-section side portions 18, each of which includes an outer leg 20 depending from one side edge of the base wall 16 and joined by a bight portion 22 to an inner free leg 24. The lower track member 14 likewise includes a base wall 26 and a pair of U-shape cross-section side portions 28 each of which interfits with a respective portion 18 and includes an inner leg 30 extending upwardly from a side edge of the base wall 26 and an outer leg 32 joined to leg 30 by a bight portion 34. The bight portions 22 of the upper track member are each provided with three successive pairs of elongated slots 36 as shown in FIGS. 3 and 6. Each pair of slots 36, as shown in FIG. 6, frictionally receives a pair of integral lugs 38 which extend from the bights of U-shape cross-section lower runners 40 which fit within the bights 22 of the upper track member and slidably embrace or receive the outer legs 32 of the lower track member. The free edge of each of the inner legs of the upper track member includes three successive slots 42 which receive three lugs 44 of U-shape cross section upper runner 46 which is received within a respective bight portion 34 of the lower track member and straddles a respective inner leg 24 of the upper track member. The upper and lower runners 46 and 40 thus slidably guide the U-shape side portions of the upper and lower track members during relative movement of the track members, with both such runners being mounted on the upper track member.

The upper track member 12 is supported on the lower track member 14 by a generally T-shape cross-section shoe 48, FIG. 4, which fits within the upper track member and includes arcuate guiding shoulders or portions 50 which slidably seat on the bight portions 34 of the lower track member. The runners and the shoe 48 are formed of low friction plastic material.

Front and rear brackets 52 and 54, respectively, are bolted at 56 to the base wall 26 of the lower track member 14 and conventionally secured to the vehicle floor pan 58 to fixedly mount the lower track member to the floor pan.

A latch member 60 is pivoted at 62 to the inboard outer wall 20 of the upper track member and extends rearwardly therealong. The latch member includes an upwardly extending tab 64, FIG. 2, having a portion 66 which overlies the base wall 16 of the upper track member for a purpose to be described. The rearward end of the latch member includes an integral laterally extending U-shape latching portion 68, one leg 70 of which extends from the latch member and the other leg 72 of which is joined by a bight portion 74 to the leg 70. With reference to FIG. 2, it will be noted that the legs 70 and 72 of the latching portion 68 are U-shaped and straddle the base wall 26 and part of the inner legs 30 of the lower track member 14. When the latch member 60 is in latched position, FIG. 1, the legs 70 and 72 slidably fit within a spaced pair of slots 76 in the side portions 18 of the upper track member and any pair of a plurality of longitudinally spaced slots 78 in the outer legs 32 of the lower track member 14 to thereby releasably lock the upper and lower track members to each other. An L-shaped tab 80 extends from the outboard end of the leg 70, FIGS. 1 and 2, and slidably bears against the leg 20 of the upper track member to provide a guide during pivotal movement of the latch member. The latch member is pivoted to released position, FIG. 3, against the bias of a spring 82 by a manually operable handle 84, FIGS. 1 and 3. If desired, this handle could extend between inboard and outboard seat adjusters 10 so as to simultaneously release both seat adjusters. Portion 66 engages the base wall 16 of the upper track member 12 to provide a positive stop upon movement of the latch member to released position.

The base wall 16 of the upper track member 12 is provided with front and rear pairs of elongated slots 86, FIG. 3, which open to a continuous longitudinal groove 88 in the shoe 48, FIG. 4. Front and rear seat mounting brackets 90 and 92, respectively, each include hooked shaped portions 94 which fit through the slots 86 and which underlie the wall 16 when inserted and moved forwardly or to the left as viewed in FIG. 1 to thereby releasably secure the brackets 90 and 92 to the upper track member 12. Upper lateral flanges of the brackets 90 and 92 are bolted at 96 to the frame or seat pan 98 of the schematically indicated vehicle seat 100 to thereby releasably secure the brackets in place to the upper track member. The rear bracket 92 includes a mounting provision 102 for mounting a seat belt retractor 104, FIG. 5, thereto. The restraint belt 106 of such retractor passes outboard through a slot 108 to locate the D-ring 110 for easy grasping by the seat occupant. The adjuster 10 is shown as an outboard adjuster and the retractor 104 is located inboard thereof. If the adjuster were an inboard adjuster, a restraint belt half would be secured thereto at the mounting provision 102. The restraint loads applied to the upper track member 12 by the restraint belt 106 and retractor 104 is resisted by the interfitting U-shape cross-section side portions of the upper and lower track members.

The bracket 92 further has a lateral apertured tab 112 which provides the upper anchor for the spring 82 which biases the latch member 60 to latched position. The lower end of the spring is hooked to leg 70. A tension spring 114 is hooked between the notch of an angle bracket 116 secured to the base wall 26 of the lower track member adjacent the forward end thereof and the elongated slot 108 of the bracket 92 to assist movement of the upper track member relative to the lower track member. An angle bracket 118 secured to the outer leg 20 of the upper track member is engageable with the bracket 116 to provide a forward stop. A plate 120 received within slots traversing the side portions 28 of the lower track member adjacent the rearward end thereof is engageable by the rearward end of the upper track member to provide a rear stop.

Thus this invention provides an improved seat adjuster.

The embodiments of the invention in which an exclusive property or privilege is claimed are defined as follows:

1. A seat adjuster comprising, in combination,
    an elongated upper track member including a base wall and a pair of U-shape cross-section side portions, each such side portion including an outer side leg depending from one side of the base wall and joined by a bight portion to an inner side leg,
    an elongated lower track member including a base wall and a pair of U-shape cross-section side portions, each including an inner side leg extending from one side of the base wall and joined by a bight portion to an outer side leg, the side portions of the upper and lower track members interfitting with each other,
    upper runner means of low friction plastic material fitted between the free edges of the inner legs of the upper track member and the bight portions of the lower track member,
    lower runner means of low friction plastic material fitted between the free edges of the outer legs of the lower track member and the bight portions of the upper track member,
    shoe means of low friction plastic material fitted between the base wall of the upper track member and the bight portions of the lower track member to slidably support the upper track member on the lower track member,
    latch means cooperatively engageable between the upper and lower track members to adjustably lock the track members in various positions relative to each other,
    the base wall of the upper track member including openings therethrough, the shoe means including a groove below such openings,
    and seat mounting brackets, each including hook shaped portions hooked to the base wall of the upper track member through the openings thereof and extending into the groove of the shoe means, said brackets being securable to a vehicle seat for mounting the seat to the upper track member, at least one of said brackets including means for mounting vehicle restraints thereto, with the loads resulting from such restraints resisted by the interfitting side portions.

2. A seat adjuster comprising, in combination,
    an elongated upper track member including a base wall and a pair of U-shape cross-section side portions, each such side portion including an outer side leg depending from one side of the base wall and joined by a bight portion to an inner side leg,
    an elongated lower track member including a base wall and a pair of U-shape cross-section side portions, each including an inner side leg extending from one side of the base wall and joined by a bight portion to an outer side leg, the side portions of the upper and lower track members interfitting with each other,
    upper runner means of low friction plastic material fitted between the free edges of the inner legs of the upper track member and the bight portions of the lower track member,
    lower runner means of low friction plastic material fitted between the free edges of the outer legs of the lower track member and the bight portions of the upper track member,
    shoe means of low friction plastic material fitted between the base wall of the upper track member and the bight portions of the lower track member to slidably support the upper track member on the lower track member,
    each bight portion of the upper track member including a pair of slots opening downwardly thereof and alignable with any pair of a plurality of slots in the outer side legs of the lower track member, latch means mounted on the upper track member and including latching portions engageable with the aligned pairs of slots to adjustably lock the track members in various positions relative to each other, and seat mounting brackets secured to the base wall of the upper track member and securable to a vehicle seat for mounting the seat to the upper track member, at least one of said brackets including means for mounting vehicle restraints thereto, with the loads resulting from such restraints resisted by the interfitting side portions.

3. A seat adjuster comprising, in combination, an elongated upper track member including a base wall and a pair of U-shape cross-section side portions, each such side portion including an outer side leg depending from one side of the base wall and joined by a bight portion to an inner side leg, an elongated lower track member including a base wall and a pair of U-shape cross-section side portions, each including an inner side leg extending from one side of the base wall and joined by a bight portion to an outer side leg, the side portions of the upper and lower track members interfitting with each other, upper runner means of low friction plastic material fitted between the free edges of the inner legs of the upper track member and the bight portions of the lower track member, lower runner means of low friction plastic material fitted between the free edges of the outer legs of the lower track member and the bight portions of the upper track member, shoe means of low friction plastic material fitted between the base wall of the upper track member and the bight portions of the lower track member to slidably support the upper track member on the lower track member, latch means cooperatively engageable between the upper and lower track members to adjustably lock the track members in various positions relative to each other, seat mounting brackets secured to the base wall of the upper track member and securable to a vehicle seat for mounting the seat to the upper track member, at least one of said brackets including means for mounting vehicle restraints thereto, with the loads resulting from such restraints resisted by the interfitting side portions, elongated spring means assisting displacement of the upper track member in one direction relative to the lower track member, one end of said spring means being secured to one of the seat mounting brackets and the other end thereof secured to anchor means on the lower track member, and stop means on the upper track member engageable with the anchor means on the lower track member to provide a stop limiting movement of the upper track member in the one direction.

4. A seat adjuster comprising, in combination, an elongated upper track member including a base wall and a pair of U-shape cross-section side portions, each such side portion including an outer side leg depending from one side of the base wall and joined by a bight portion to an inner side leg, an elongated lower track member including a base wall and a pair of U-shape cross-section side portions, each including an inner side leg extending from one side of the base wall and joined by a bight portion to an outer side leg, the side portions of the upper and lower track members interfitting with each other, upper runner means of low friction plastic material fitted between the free edges of the inner legs of the upper track member and the bight portions of the lower track member, lower runner means of low friction plastic material fitted between the free edges of the outer legs of the lower track member and the bight portions of the upper track member, shoe means of low friction plastic material fitted between the base wall of the upper track member and the bight portions of the lower track member to slidably support the upper track member on the lower track member, said shoe means including a groove therein opening to the base wall of the upper track member, latch means cooperatively engageable with the interfitting side portions of the upper and lower track members to adjustably lock the track members in various positions relative to each other, the base wall of the upper track member including a series of spaced openings therethrough to the groove of the shoe means, and a seat mounting bracket including a hook shaped portion hooked through a number of openings in the base wall of the upper track member and received in the groove of the shoe means, said bracket being securable to a vehicle seat for mounting the seat to the upper track member, said bracket including means for mounting a vehicle restraint thereto with the loads resulting from such restraint being resisted by the interfitting side portions and by the latch means engaged therewith.

* * * * *